(12) United States Patent
Ganon et al.

(10) Patent No.: US 11,687,483 B1
(45) Date of Patent: Jun. 27, 2023

(54) EMBEDDED PHYSICAL LAYERS WITH PASSIVE INTERFACING FOR CONFIGURABLE INTEGRATED CIRCUITS

(71) Applicant: Western Digital Technologies, Inc., San Jose, CA (US)

(72) Inventors: Doron Ganon, Rehan (IL); Ofer Shahar, Hatzaftzafot (IL); Or Faerman, Kibbutz Yifat (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/457,659

(22) Filed: Dec. 5, 2021

(51) Int. Cl.
*G06F 13/42* (2006.01)

(52) U.S. Cl.
CPC ...... *G06F 13/4282* (2013.01); *G06F 13/4221* (2013.01); *G06F 2213/0024* (2013.01); *G06F 2213/0042* (2013.01)

(58) Field of Classification Search
None
See application file for complete search history.

(56) References Cited

U.S. PATENT DOCUMENTS

| | | | |
|---|---|---|---|
| 8,872,546 B2 | 10/2014 | Zou et al. | |
| 9,009,379 B1 | 4/2015 | Marena et al. | |
| 10,579,581 B2* | 3/2020 | Pitigoi-Aron | G06F 13/4291 |
| 2007/0124526 A1* | 5/2007 | Sinai | G06F 13/4022 |
| | | | 710/306 |
| 2010/0253319 A1* | 10/2010 | Cehelnik | G06F 3/0443 |
| | | | 324/72 |
| 2011/0138096 A1* | 6/2011 | Radulescu | G06F 13/385 |
| | | | 710/305 |
| 2014/0070846 A1* | 3/2014 | Zou | G01R 31/31924 |
| | | | 326/82 |
| 2014/0108686 A1* | 4/2014 | Wagh | G06F 13/4282 |
| | | | 710/106 |
| 2018/0189224 A1* | 7/2018 | Vadivelu | G06F 13/4282 |
| 2019/0041458 A1* | 2/2019 | Koki | G01R 31/31706 |

(Continued)

FOREIGN PATENT DOCUMENTS

| | | |
|---|---|---|
| CN | 205068388 U | 3/2016 |
| CN | 209267704 U | 8/2019 |

OTHER PUBLICATIONS

Arasan Chip Systems, UFS 3.0 Total IP Solution Datasheet, 2018.

(Continued)

*Primary Examiner* — Henry Tsai
*Assistant Examiner* — Christopher A Bartels (57) ABSTRACT

Disclosed herein are devices and systems that embed a physical layer (e.g., an M-PHY) on a configurable integrated circuit (e.g., an FPGA) and include glue hardware that provides AC coupling between a high-speed serial communication device (e.g., a MIPI device) and the configurable integrated circuit. The glue hardware provides AC coupling using only resistors, capacitors, and inductors. The configurable integrated circuit includes a logic block that manages the operation to provide the desired PHY connectivity. Because the disclosed devices and systems use AC coupling, the signaling drive and receive paths are controlled based on the received signal frequency and not based on the mode (e.g., LS mode or HS mode). Specifically, the line state of the MIPI device is inferred from observation of signal transitions as opposed to direct detection of DC signal levels.

30 Claims, 4 Drawing Sheets

(56) References Cited

U.S. PATENT DOCUMENTS

| | | | |
|---|---|---|---|
| 2019/0121765 A1* | 4/2019 | Srivastava | G06F 13/1673 |
| 2019/0258251 A1* | 8/2019 | Ditty | G06V 20/58 |
| 2019/0265900 A1* | 8/2019 | Kim | G11C 15/046 |
| 2020/0091608 A1* | 3/2020 | Alpman | H01Q 1/2283 |
| 2021/0270896 A1 | 9/2021 | Ganon et al. | |

OTHER PUBLICATIONS

Intel AN 754: MIPI D-PHY Solution with Passive Resistor Networks in Intel Low-Cost FPGAs, Apr. 2019.
MIPI Alliance, "Draft Specification for M-PHY®," Version 5.0 Revision 02—Aug. 28, 2020.
MIPI Alliance, "Specification for M-PHY®," Version 4.1—Dec. 1, 2016.
MIPI Alliance, "Specification for Unified Protocol (UniPro®)," Version 1.8—Sep. 13, 2017.
Press release, "Arasan and Xilinx announce their design win in providing a Total UFS 3.0 Solution to Wuhan Jingce," Aug. 26, 2019.
Synopsys, "Reducing Power Consumption in Mobile Applications with High-Speed Gear3 MIPI M-PHY IP," Nov. 2013.
Xilinx, "UltraScale Architecture GTY Transceivers, User Guide," UG578 (v1.3.1) Sep. 14, 2021.

* cited by examiner

EMBEDDED PHYSICAL LAYERS WITH PASSIVE INTERFACING FOR CONFIGURABLE INTEGRATED CIRCUITS

BACKGROUND

There are a number of industry standards specifying high-speed communication via serial interfaces. As one example, the Mobile Industry Processor Interface (MIPI) Alliance is an industry consortium that has developed a number of specifications for high-speed serial interface solutions for a variety of mobile chip-to-chip communication standards and protocols. The MIPI Alliance specifies protocols and physical layer (PHY) standards for a variety of applications (e.g., JEDEC Universal Flash Storage (UFS), USB 3.0 SuperSpeed Inter-chip (SSIC), PCI-SIG M-PCIe, etc.). As one example, the Peripheral Component Interconnect Express (PCIe) is a high-speed serial computer expansion bus standard that allows, for example, a computer's motherboard (also referred to as a host) to communicate with peripherals (also referred to as endpoints), such as graphics cards, sound cards, and expansion cards.

The MIPI D-PHY is a PHY specification that provides a synchronous connection between a host and another device (e.g., a chip). The D-PHY is now common enough that makers of field-programmable gate arrays (FPGAs) often include a D-PHY transceiver in their devices for purposes such as testing.

The MIPI M-PHY is a successor of the D-PHY. The M-PHY is a serial interface with high-bandwidth capabilities suitable for multiple protocols, and it provides higher bit rates and is more power-efficient than the D-PHY. The M-PHY has both high-speed (HS) and low-speed (LS) modes. The high-speed transmission modes are referred to as "gears." Each gear specifies a range of speeds (for LS) or a set of fixed bit rates (for HS). To date, five gears have been defined: Gear1, Gear2, Gear3, Gear4, and Gear5, where Gear5 is the fastest (highest bit-rate) gear. Even higher-speed gears may be defined in the future (e.g., Gear6 and above).

There is an ongoing need for devices and systems that can communicate with MIPI-compliant devices (also referred to herein as simply "MIPI devices") using higher gears (e.g., operating at higher speeds). For example, there is a need for systems and devices that can test the operation of MIPI devices over the full range of gears and, within each gear, speeds/bit rates.

SUMMARY

This summary represents non-limiting embodiments of the disclosure.

Disclosed herein are devices and systems that embed a physical layer (e.g., an M-PHY) on a configurable integrated circuit (e.g., an FPGA) and include glue hardware that provides AC coupling between a high-speed serial communication device (e.g., a MIPI device, which may be a device under test (DUT)) and the configurable integrated circuit. Also disclosed are methods of using such devices and systems.

The disclosed glue hardware provides AC coupling by using only simple passive components (R, L, C). The configurable integrated circuit includes a logic block (e.g., RTL, HDL, etc.) that manages the operation to provide the desired PHY connectivity. In contrast to other possible solutions, because the disclosed devices and systems use AC coupling between a MIPI device and a configurable integrated circuit that provides transceiver functionality, the signaling drive and receive paths are controlled based on the received signal frequency and not based on the mode (e.g., a direct indication that the MIPI device is operating in LS mode or HS mode). For example, certain the line states of the MIPI device are inferred from the observation of signal transitions as opposed to direct detection of DC signal levels.

In contrast to alternative solutions, by using AC-coupled interfaces, the disclosed architecture eliminates from the glue hardware active components and their associated frequency bandwidth limitations. As a result, the disclosed solutions can accommodate higher-speed interfaces than alternative solutions, and the systems, devices, and methods are more "future-proof" than alternative approaches. In addition, eliminating active components from the glue hardware simplifies the solution and reduces its cost relative to alternative solutions that use active analog components (e.g., amplifiers) in the glue hardware.

In some aspects, the techniques described herein relate to a system, including: a configurable integrated circuit; and an embedded physical layer (EPHY), the EPHY including: a logic portion disposed in the configurable integrated circuit; and a glue hardware portion coupled to the configurable integrated circuit and configured to provide AC coupling between at least one interface of the configurable integrated circuit and a serial interface of an external device.

In some aspects, the techniques described herein relate to a system, wherein the configurable integrated circuit includes a field-programmable gate array (FPGA).

In some aspects, the techniques described herein relate to a system, wherein the logic portion includes at least one native transceiver of the FPGA.

In some aspects, the techniques described herein relate to a system, wherein the at least one native transceiver includes a Mobile Industry Processor Interface (MIPI) D-PHY transceiver.

In some aspects, the techniques described herein relate to a system, wherein the at least one native transceiver includes a PCIe transceiver.

In some aspects, the techniques described herein relate to a system, wherein the glue hardware portion includes receive-path circuitry configured to assist the logic portion in detecting a line state of a transmitter of the external device.

In some aspects, the techniques described herein relate to a system, wherein detecting the line state of the transmitter of the external device includes detecting an entry into or exit from a reduced-power state.

In some aspects, the techniques described herein relate to a system, wherein the logic portion is configured to perform operations of a Mobile Industry Processor Interface (MIPI)-compliant receiver, and wherein the reduced-power state is at least one of HIBERN8, STALL, or SLEEP.

In some aspects, the techniques described herein relate to a system, wherein the line state of the transmitter of the external device is one of a plurality of line states, and wherein the logic portion includes a high-speed receive logic block, a low-speed receive logic block, and a squelch detector, and wherein the logic portion is configured to determine the line state of the transmitter of the external device using at least one of the high-speed receive logic block, the low-speed receive logic block, or the squelch detector.

In some aspects, the techniques described herein relate to a system, wherein the logic portion includes a first transmit logic block and a second transmit logic block, wherein the first transmit logic block is configured to operate at a higher maximum bit rate than the second transmit logic block, and wherein the glue hardware portion further includes transmit-path circuitry including a transmit-path switch configured to couple either the first transmit logic block or the second transmit logic block to the serial interface of the external device, and wherein the logic portion is further configured to control a position of the transmit-path switch based on the detected line state of the transmitter of the external device.

In some aspects, the techniques described herein relate to a system, wherein the glue hardware portion includes a plurality of capacitors, a plurality of inductors, and a plurality of resistors.

In some aspects, the techniques described herein relate to a system, wherein the logic portion includes at least one logic block configured to provide functionality of a receiver, and wherein the glue hardware portion includes receive path circuitry.

In some aspects, the techniques described herein relate to a system, wherein at least a portion of the receive path circuitry is configured to assist the logic portion to identify a line state of the external device.

In some aspects, the techniques described herein relate to a system, wherein the at least one logic block is configured to receive differential signals over a first line and a second line, and wherein the receive path circuitry includes a first comparator and a second comparator, wherein: a first input of the first comparator is coupled to the first line, a second input of the first comparator is coupled to a reference voltage, a first input of the second comparator is coupled to the second line, and a second input of the second comparator is coupled to the reference voltage.

In some aspects, the techniques described herein relate to a system, wherein the first input of the first comparator is coupled to the first line through a first at least one resistor, and the first input of the second comparator is coupled to the second line through a second at least one resistor.

In some aspects, the techniques described herein relate to a system, wherein the first input of the first comparator is coupled to a first pull-down resistor, and the first input of the second comparator is coupled to a second pull-down resistor.

In some aspects, the techniques described herein relate to a system, wherein the logic portion is configured to control a transmit path.

In some aspects, the techniques described herein relate to a system, wherein the glue hardware portion includes transmit-path circuitry configured to assist the logic portion to provide, to the external device, either a lower-speed signal or a higher-speed signal.

In some aspects, the techniques described herein relate to a system, wherein the logic portion includes a first logic block configured to operate as a higher-speed transceiver and a second logic block configured to operate as a lower-speed transceiver, and wherein the glue hardware portion further includes transmit path circuitry including: a first inductor; a switch coupled to and controlled by the logic portion, the switch having a first position in which the lower-speed transceiver is connected to the first inductor and a second position in which the higher-speed transceiver is connected to the first inductor; and a passive circuit connected to the higher-speed transceiver, wherein the passive circuit includes a second inductor, a plurality of resistors, and a capacitor.

In some aspects, the techniques described herein relate to a system, wherein the logic portion includes a first logic block configured to operate as a higher-speed transceiver and a second logic block configured to operate as a lower-speed transceiver, and wherein the logic portion is configured to transmit differential signals over a first line and a second line, and wherein the glue hardware portion further includes transmit path circuitry including: a first inductor; a first switch coupled to and controlled by the logic portion, the first switch having a first position in which a first interface of a transmitter of the lower-speed transceiver is connected to the first inductor and a second position in which a first interface of a transmitter of the higher-speed transceiver is connected to the first inductor; a first passive circuit connected to the first interface of the transmitter of the higher-speed transceiver, wherein the first passive circuit includes a second inductor, a first plurality of resistors, and a first capacitor; a third inductor; a second switch coupled to and controlled by the logic portion, the second switch having a first position in which a second interface of the transmitter of the lower-speed transceiver is connected to the third inductor and a second position in which a second interface of the transmitter of the higher-speed transceiver is connected to the third inductor; and a second passive circuit connected to the second interface of the transmitter of the higher-speed transceiver, wherein the second passive circuit includes a fourth inductor, a second plurality of resistors, and a second capacitor.

In some aspects, the techniques described herein relate to a method of using a configurable integrated circuit to communicate over an AC-coupled path with a Mobile Industry Processor Interface (MIPI) device, the method including: via at least one interface of the configurable integrated circuit, receiving, over the AC-coupled path, a MIPI signal transmitted by the MIPI device; and determining a line state of the MIPI device based on the received MIPI signal.

In some aspects, the techniques described herein relate to a method, wherein determining the line state of the MIPI device based on the received MIPI transmit signal includes detecting a transition into or out of a HIBERN8, STALL, or SLEEP state.

In some aspects, the techniques described herein relate to a method, wherein determining the line state of the MIPI device based on the received MIPI transmit signal includes: a comparator comparing a level of the received MIPI transmit signal to a reference voltage; and the configurable integrated circuit obtaining an output from the comparator.

In some aspects, the techniques described herein relate to a method, wherein determining the line state of the MIPI device based on the received MIPI transmit signal includes detecting a squelch signal.

In some aspects, the techniques described herein relate to a method, wherein determining the line state of the MIPI device based on the received MIPI transmit signal includes using a first transceiver of the configurable integrated circuit to detect a first line state and using a second transceiver of the configurable integrated circuit to detect a second line state.

In some aspects, the techniques described herein relate to a method, wherein the first transceiver includes a D-PHY transceiver and the second transceiver includes a PCIe transceiver.

In some aspects, the techniques described herein relate to a method, wherein the first line state includes a STALL state, a SLEEP state, or a PREPARE phase.

In some aspects, the techniques described herein relate to a method, wherein the second line state includes a data transmission phase.

In some aspects, the techniques described herein relate to a system for communicating with a Mobile Industry Processor Interface (MIPI) device, the system including: a configurable integrated circuit; means for AC coupling an interface of the MIPI device to at least one interface of the configurable integrated circuit; and means for receiving a MIPI transmit signal from the MIPI device.

In some aspects, the techniques described herein relate to a system, wherein the configurable integrated circuit includes: means for determining a line state of the MIPI device based on the received MIPI transmit signal.

In some aspects, the techniques described herein relate to a system, further including: means for selectively providing one of a higher-speed signal or a lower-speed signal to the MIPI device.

BRIEF DESCRIPTION OF THE DRAWINGS

Objects, features, and advantages of the disclosure will be readily apparent from the following description of certain embodiments taken in conjunction with the accompanying drawings in which.

To facilitate understanding, identical reference numerals have been used, where possible, to designate identical elements that are common to the figures. It is contemplated that elements disclosed in one embodiment may be beneficially utilized in other embodiments without specific recitation. Moreover, the description of an element in the context of one drawing is applicable to other drawings illustrating that element.

DETAILED DESCRIPTION

Incorporation by Reference

The following documents are hereby incorporated by reference in their entireties for all purposes as if bodily set forth herein: (1) MIPI Alliance, "Specification for M-PHY®," Version 4.1-1 Dec. 2016; (2) MIPI Alliance, "Specification for Unified Protocol (UniPro®)," Version 1.8-13 Sep. 2017.

Terminology, Acronyms, and Initialisms

The disclosures herein are not limited to MIPI applications. Nevertheless, for convenience of explanation, certain terminology and acronyms/initialisms from the MIPI Alliance "Specification for M-PHY®," Version 4.1-1 Dec. 2016 are used herein. Specifically:

HS and LS are, respectively, the initialisms for "high-speed" and "low-speed."

RX is the initialism for "receive" or "receiver," and TX is the initialism for "transmit" or "transmitter."

An M-RX is an M-PHY electrical receiver, and an M-TX is an M-PHY electrical transmitter.

A "pin" is a point of external physical electrical connection for a component. Examples of pins include, but are not limited to, BGA balls, QFP leads, and solder pads.

A "line" is a differential point-to-point interconnect between the pins of the M-TX and M-RX.

A "lane" is a unidirectional, point-to-point, differential serial connection. A lane includes an M-TX, an M-RX, and a line.

DIF-N is a logical line state, driven by the M-TX, corresponding to a negative differential line voltage. DIF-P is a logical line state, driven by the M-TX, corresponding to a positive differential line voltage. DIF-Z is a logical line state, driven by the M-RX, corresponding to almost zero differential line voltage. For MIPI devices, the voltage levels and signal transition timing specifications for the M-TX and M-RX, and detection requirements for the M-RX, are defined in Section 5 of the MIPI Alliance "Specification for M-PHY®," Version 4.1-1 Dec. 2016.

HIBERN8 (also abbreviated herein as H8 or HIB8) is a deep low-power state in which configuration information is retained. In HIBERN8, the M-TX is high-impedance, and the M-RX holds the line at DIF-Z. Under these conditions, the M-RX is considered to be in "squelch."

A "burst" is a sequence of data transmission that is delimited by and includes a HEAD-OF-BURST (HOB) and TAIL-OF-BURST (TOB). A burst can be an HS-BURST (for HS) or an LS-BURST (for LS).

The TAIL-OF-BURST (TOB) is a bit sequence indicating the end of a burst.

STALL is a power-saving state used between HS-BURSTs.

SLEEP is a power-saving state used between LS-BURSTs.

"Payload" is a burst without the HOB and TOB.

A "marker" is a non-data symbol that is used for protocol-related control purposes.

The HEAD-OF-BURST (HOB) is the period between exiting the STALL state (for HS) or the SLEEP state (for LS) and the first marker in a burst, which indicates the start of payload data.

PREPARE is the first part of the HOB after exiting the STALL state or the SLEEP state. PREPARE extends up to but does not include the SYNC sequence.

The SYNC sequence is a pre-defined symbol sequence intended for bit synchronization of the M-RX to the embedded clock data stream.

HS-BURST is a high-speed state that includes PREPARE, SYNC, MARKERs, and data.

HS-MODE is a high-speed operation loop that includes STALL and HS-BURST(s).

Pulse-width modulation (PWM) is a bit modulation scheme that carries the data information in the duty-cycle and explicit clock information in the period.

LS-BURST is a low-speed state including PREPARE, MARKERs, and data.

A PWM-BURST is the transmission of an LS-BURST in PWM bit format using a specified coding.

LS-MODE is a low-speed operation loop.

A "rate" is the speed of communication (e.g., in kbit/s, Mbit/s, Gbit/s, etc.).

An HS-GEAR is a gear in HS-MODE.

The "mode" indicates either HS-MODE or LS-MODE.

Discussion

Embodiments of the present disclosure generally relate to embedded physical layers (EPHYs) for configurable integrated circuits, such as FPGAs.

As noted above, the disclosures herein are presented primarily in the context of, and using terminology and abbreviations from, MIPI specifications, including the MIPI Alliance "Specification for M-PHY®," Version 4.1-1 Dec. 2016, which has been incorporated by reference in its entirety. It is to be understood, however, that the disclosures are applicable to other environments and applications. For example, the disclosures herein can be applied generally to allow a first device to communicate at high speeds over a serial interface with a second device.

An application or a device that uses an FPGA as a core controller can use a MIPI PHY interface (e.g., D-PHY and/or M-PHY) to interface with a MIPI device, which may have any number of lanes (e.g., 1, 2 or 4 lanes). In one approach, an FPGA native PCIe PHY transceiver input/output (TO) along with a regular FPGA D-PHY IO is used to interface with MIPI devices. The hardware to interface with MIPI devices typically includes active components such as an operational amplifier (op-amp) and digital multiplexers. For example, the hardware may include an op-amp with a low-speed/high-speed selector hardware multiplexer on the transmit and receive paths. Some MIPI speeds (e.g., Gear4) can be tested using low-speed/high-speed signaling and such a hardware configuration. In this approach, the signal path(s) between the FPGA and the MIPI device are DC coupled as specified by the MIPI specification(s).

Certain MIPI M-PHY applications, such as storage UFS, video, monitors, Wi-Fi, etc., would benefit from an FPGA-based host device incorporating a MIPI M-PHY interface, but most FPGAs do not yet include native transceivers to support the MIPI M-PHY interface. Existing solutions that use op-amps and hardware multiplexers on the hardware path to interface with MIPI devices are generally not suitable for higher gears, such Gear5, because of the use of DC coupling. Specifically, the FPGA native PCIe PHY is not aligned with the analog MIPI PHY on the DC level, so operation with higher gears (e.g., Gear5) requires the op-amp bandwidth to extend from DC to a maximum frequency that may be 20 GHz or higher. Currently-available active components such as op-amps and hardware multiplexers impose restrictions on the maximum bandwidth of signals. These limitations foreclose their use for higher gears such as Gear5. In other words, the speeds that can be tested by solutions that use these active components are limited because of bandwidth limitations of the active components.

Another drawback of these approaches is that accommodating surface-mounted amplifiers and multiplexers on a printed circuit board (PCB) can introduce discontinuities in transmission lines, and these discontinuities can negatively affect signal quality. In addition, discontinuities can result in excess radiated emissions from an unbalanced current flow, delays in signal propagation delays due to increased series inductance, interference with adjacent signals, and/or degraded signal integrity (e.g., higher jitter and lower signal amplitude). Radio-frequency interference problems, in particular, may be exacerbated at higher signaling speeds (e.g., Gear5).

Disclosed herein are embodiments of systems, devices, and methods that address limitations and drawbacks of alternative approaches and accommodate communication (e.g., for testing) via both low-speed signaling and high-speed signaling (e.g., to communicate with MIPI devices, such as M-PHY devices operating at higher Gears, such as Gear5). The disclosed embodiments include a logic block (e.g., RTL, HDL, etc.) in a configurable integrated circuit (e.g., an FPGA) and glue hardware situated between the configurable integrated circuit and an external device (e.g., a MIPI device under test (DUT)). The logic block manages operations to meet the applicable communication specification (e.g., MIPI specification(s)). For MIPI applications, the logic block can work in parallel for each lane and for each communication direction (TX and RX). In some embodiments, the logic block includes a D-PHY IO to carry out LS communication and a PCIe PHY transceiver IO to carry out HS communication.

Generally speaking, the signaling drive and receive paths are controlled based on the signal frequency rather than based on the mode (LS or HS). In MIPI applications, for the LS path(s), because MIPI signaling defines the operation burst, the LS signaling (e.g., PWM) can be driven or received by a native D-PHY IO of the configurable integrated circuit (e.g., FPGA) when a low-frequency switch (SW) is in a first, low-frequency (LF) state. This approach meets the MIPI-specified analog requirements using DC coupling and differential signal swing.

As disclosed further below, for the HS path(s), however, the signaling between the host system (e.g., a test system) and the external MIPI device uses AC coupling, rather than DC coupling, to avoid the active components that might otherwise be used in the glue hardware and their associated frequency limitations. As will be appreciated by those having ordinary skill in the art, AC coupling can be used to change the common-mode voltage level when interconnecting different physical layers. By AC coupling the input signal, there is no need to match the common-mode voltage of the inputs. Managing the voltage swing (amplitude) of the signal ensures that the input range is not exceeded. As long as high-speed serial data transmission is DC-balanced, AC coupling will not generate baseline wander. Thus, the use of AC coupling on the HS path(s) as disclosed herein eliminates DC common-mode issues that might otherwise arise.

As explained further below, AC coupling can be provided by simple passive components in the glue hardware, and the configurable integrated circuit can include, for example, one or more high-frequency IOs (e.g., GTY transceiver(s) of a Xilinx FPGA, a native PCIe-Gen5 transceiver (e.g., capable of transmitting 32 Gbit/s), etc.) to drive and receive the high-frequency (high-speed) signals, as explained further below. Thus, in contrast to other solutions, for high-speed signaling, the glue hardware includes only simple passive components (e.g., R, L, C) and does not require any active components (e.g., op-amps, multiplexers, etc.) that might impose bandwidth limitations that could prevent testing higher-speed gears, such as Gear5. Accordingly, the solution can accommodate Gear5 and even higher gears.

In some embodiments, the system includes a TX block and a RX block. Each block (TX and RX) can include multiple instantiations of each path to support multiple lanes. For example, TX and RX block can each include two instantiations of each path to support two lanes. To interface with MIPI devices, the TX block can be configured to deliver low-speed/low-frequency signaling via a lower-speed transceiver of a configurable integrated circuit (e.g., a native D-PHY transceiver) and high-speed/high-frequency signaling via a native high-speed transceiver of the configurable integrated circuit, as described further below. For example, the configurable integrated circuit can be a Xilinx FPGA (e.g., a UG578) that includes a native D-PHY transceiver and an UltraScale® Architecture GTY transceiver. The TX block can deliver low-speed (PWM)/low-frequency signaling using the native D-PHY transceiver and high-speed/high-frequency signaling using the GTY transceiver. Alternatively, other native lower-speed and higher-speed (e.g., a native PCIe-Gen5 transceiver (e.g., capable of transmitting 32 Gbit/s), etc.) transceivers can be used.

The disclosed embodiments offer a number of benefits, including that an M-PHY can be implemented using a variety of FPGAs that do not include a native M-PHY. In addition, because the glue hardware does not use active components for the high-speed path, a native higher-speed PHY (e.g., the Xilinx PCIe GTY/32 Gbit/s or any other native PCIe-Gen5 transceiver (e.g., capable of transmitting 32 Gbit/s), etc.) can be used to interface to MIPI devices that use Gear5 (or higher gears generally). Because the glue hardware uses passive components as opposed to active components to accommodate higher speeds, the cost of the solution is lower than the cost of alternative approaches. Furthermore, future-generation transceivers that support even higher bit rates can also be supported because there are no active components with bandwidth limitations on the high-speed signal path(s). Another potential advantage is a reduction in FPGA connections and/or IO counts (compared to other approaches of using external PHY chip devices). In addition, the same FPGA can support several MIPI interfaces as long as it has enough, and the right type of, transceiver(s) (e.g., GTY or a native PCIe-Gen5 transceiver (e.g., capable of transmitting 32 Gbit/s), for Gear5), and the appropriate passive glue hardware described herein is provided. Another potential benefit is improved debug capability because the FPGA embedded PHY (EPHY) logic is exposed to the physical layer in the interface, as opposed to when the PHY is external.

One application of the systems disclosed herein is testing of devices that use serial interfaces for communication. Accordingly, the discussion below assumes that embodiments of the disclosed system are used in a testing environment, such as to test operation of a device under test (DUT). It is to be understood that this application is merely exemplary. The disclosed systems, devices, and methods can be used in a variety of applications, as will be appreciated from the discussion herein.

Figure 1:
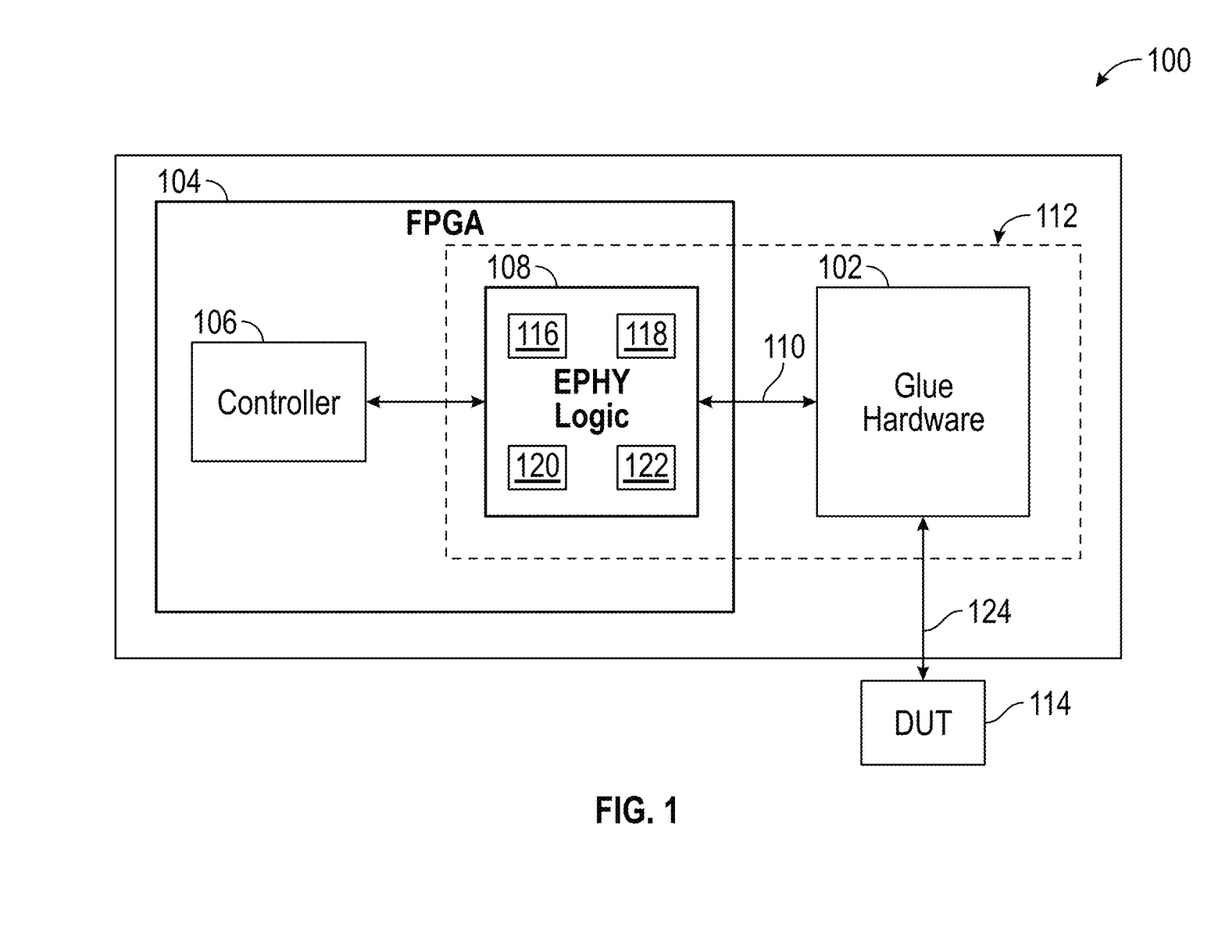
FIG. 1 is a schematic illustration of a system coupled to a device in accordance with some embodiments.

FIG. 1 is a schematic illustration of a system 100 coupled to a DUT 114 (e.g., a MIPI device with an M-PHY) in accordance with some embodiments. As shown in FIG. 1, the system 100 includes a configurable integrated circuit 104 that has a controller 106. The configurable integrated circuit 104 may be, for example, an FPGA, as shown in the example of FIG. 1. The system 100 includes an embedded EPHY 112 that is coupled to the controller 106. The EPHY 112 includes two components: a logic portion, shown as EPHY logic 108, and a glue hardware portion, shown as glue hardware 102.

The EPHY logic 108 is situated within the configurable integrated circuit 104 and communicates with the DUT 114 through the glue hardware 102. More specifically, the configurable integrated circuit 104 is physically connected to the glue hardware 102 by one or more lines 110 that support transmitting and/or receiving between the configurable integrated circuit 104 and the DUT 114. (It is to be appreciated that although the lanes used by MIPI devices are unidirectional, there may be other applications in which communication over a single line (e.g., a twisted-pair) is bidirectional.)

In the example of FIG. 1, the EPHY logic 108 includes one or more logical transmission blocks 116, one or more logical receiving blocks 118, one or more logical high-speed interfaces 120, and one or more logical low-speed interfaces 122. It is to be understood that the interfaces are "high-speed" and "low-speed" relative to each other such that the one or more logical high-speed interfaces 120 generally operate at a higher speed than the one or more logical low-speed interfaces 122.

The glue hardware 102 is configured to be connected to and to communicate with the DUT 114 through one or more lines 124, which may permit transmitting and receiving. The glue hardware 102 may be physical hardware of the EPHY 112 that is attached to or "glued" to the board or substrate upon which the system 100 is fabricated.

Numerous DUTs 114 operate at higher speeds, whereas other DUTs 114 operate at lower speeds. The system 100 is able to communicate with (e.g., send transmissions to and/or receive transmissions from) both lower-speed DUTs 114 and higher-speed DUTs 114. An example of higher-speed transmission is greater than 24 Gbit/s, whereas an example of a lower-speed transmission is less than 24 Gbit/s. It is to be understood that the specific speeds provided herein are for example only. The disclosures are not to be limited to specific speeds (or, in the context of MIPI devices, gears). Rather, the system 100 is capable of communicating with external devices that support different transmission speeds and/or operate under different transmission standards. For example, the system 100 may be understood to send and receive transmissions at a first speed and at a second speed that is different from the first speed.

It is to be appreciated that the system 100 is capable of communicating with different DUTs 114 operating at different transmission speeds, even if those DUTs 114 are operating under the same standard (e.g., MIPI M-PHY). Furthermore, it is to be appreciated that the system 100 is capable of communicating with different DUTs 114 that each operate according to substantially the same transmission speeds, even if operating under different standards. Additionally, it is to be understood that the system 100 is capable of communicating with different DUTs 114 that each operate according to different transmission speeds and different standards. Finally, it is to be understood that the system 100 is capable of communicating with different DUTs 114 that each operate according to substantially the same transmission speeds as well as the same standard.

Figure 2:
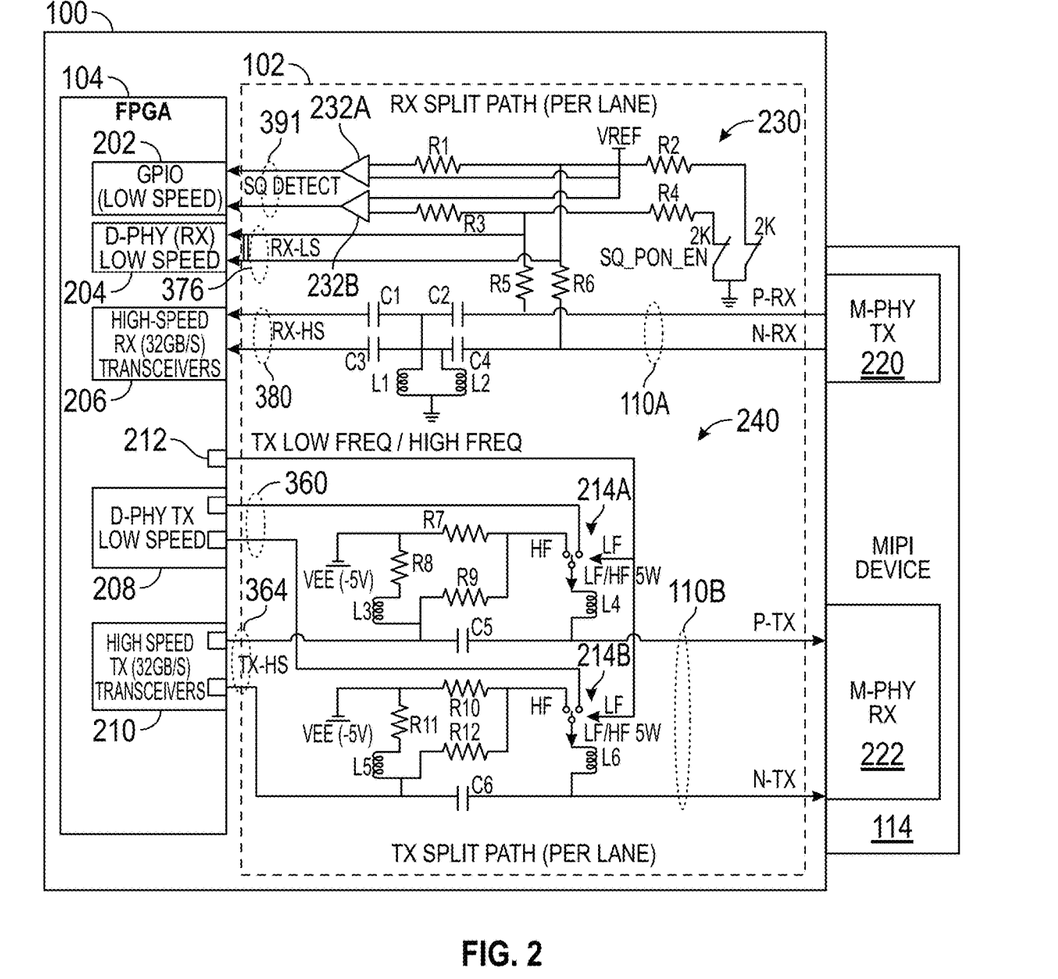
FIG. 2 is a more detailed view of the system of FIG. 1 coupled to a device in accordance with some embodiments.

FIG. 2 is a more detailed view of the example system 100 of FIG. 1 coupled to a DUT 114 in accordance with some embodiments. FIG. 2 illustrates only one lane in each direction of transmission. It is to be appreciated that the system 100 can include a plurality of lanes in each transmission direction. As shown, the DUT 114 includes a transmitter portion 220 and a receiver portion 222, which may be, for example, compatible with the MIPI M-PHY specification as illustrated in the example of FIG. 2. The illustrated DUT 114 transmits and receives differential signals. Thus, when the DUT 114 is connected to the system 100, the transmitter portion 220 provides signals to the system 100 over the lines 110A labeled "P-RX" and "N-RX," and the receiver portion 222 receives signals from the system 100 over the lines 110B labeled "P-TX" and "N-RX." Each of the lines 110A and each of the lines 110B may be, for example, a wire.

As illustrated, the system 100 includes a configurable integrated circuit 104 and glue hardware 102. As explained above, the configurable integrated circuit 104 may be, for example, an FPGA. In the example of FIG. 2, the configurable integrated circuit 104 includes a number of logic blocks, including a general-purpose input/output ("GPIO (low speed)") logic block 202, a low-speed receive logic block 204 ("D-PHY (RX) low speed"), a high-speed receive logic block 206 ("High-speed RX (32 GB/S) Transceivers"), a low-speed transmit logic block 208 ("D-PHY (TX) low speed"), and a high-speed transmit logic block 210 ("High-speed TX (32 GB/S) Transceivers"). The logic block 202 receives signals over the lines 391, the low-speed receive logic block 204 receives signals over the lines 376, and the high-speed receive logic block 206 receives signals over the lines 380. The low-speed transmit logic block 208 provides signals over the lines 360, and the high-speed transmit logic block 210 provides signals over the lines 364.

The low-speed receive logic block 204 and low-speed transmit logic block 208 may be compatible with, for example, the MIPI D-PHY specification. For example, the configurable integrated circuit 104 may be an FPGA, and the functions of the low-speed receive logic block 204 and low-speed transmit logic block 208 may be carried out by one or more native D-PHY transceivers of the FPGA. Thus, for low-speed signaling, the interface to the low-speed receive logic block 204 and the interface to the low-speed transmit logic block 208 may be able to meet MIPI analog requirements using a D-PHY transceiver (e.g., PWM up to 9 Mbit/s).

The high-speed receive logic block 206 and high-speed transmit logic block 210 may be implemented using, for example, a native high-speed transceiver of the configurable integrated circuit 104, which need not be an M-PHY transceiver. For example, the high-speed receive logic block 206 and high-speed transmit logic block 210 may be implemented using a Xilinx GTY 32 Gbit/s transceiver, which is a power-efficient transceiver that supports line rates from 500 Mbit/s to as high as 32.75 Gbit/s. Other native FPGA transceivers could also be used, and the disclosures herein are not intended to be limited to the example Xilinx GTY 32 Gibt/s transceiver. For example, any native PCIe-Gen5 transceiver (e.g., capable of transmitting 32 Gbit/s) can be suitable for M-PHY applications.

As shown in FIG. 2, the configurable integrated circuit 104 also includes a connection point 212 (e.g., a pin) that provides a signal to a switch 214A and a switch 214B in the glue hardware 102. The switch 214A and switch 214B are described further below.

The glue hardware 102 includes receive path circuitry 230 and transmit path circuitry 240. In the example shown in FIG. 2, the receive path circuitry 230 comprises a plurality of capacitors, a plurality of inductors, a plurality of resistors, and a plurality of comparators. Specifically, the receive path circuitry 230 comprises capacitors C1, C2, C3, and C4, inductors L1 and L2, and resistors R1, R2, R3, R4, R5, and R6, situated and connected as shown in FIG. 2. The receive path circuitry 230 also includes comparator 232A and comparator 232B. Note that the receive path circuitry 230 includes a connection to a voltage source, $V_{REF}$, which serves as one input to each of the comparator 232A and comparator 232B.

In the example shown in FIG. 2, the transmit path circuitry 240 includes a plurality of capacitors, a plurality of inductors, a plurality of resistors, and a plurality of switches. Specifically, the transmit path circuitry 240 comprises capacitors C5 and C6, inductors L3, L4, L5, and L6, and resistors R7, R8, R9, R10, R11, and R12, and the switch 214A and switch 214B, situated and connected as shown in FIG. 2. Note that the transmit path circuitry 240 includes a connection to a voltage source, $V_{EE}$, which may be, for example, −5 V.

As will be appreciated by those having ordinary skill in the art, in both the TX and RX directions, the glue hardware 102 shown in FIG. 2 blocks the DC component (common-mode voltage) of a signal and passes on the AC component (voltage swing). The glue hardware 102 also sets the common-mode voltage and provides proper termination impedance. The values of the individual resistors, capacitors, and inductors of FIG. 2 depend on a number of factors, including the supply voltage, operating frequency, and characteristics of the configurable integrated circuit 104.

In the transmit direction, either a signal from the low-speed transmit logic block 208 or a signal from the high-speed transmit logic block 210 is provided to the receiver portion 222 of the DUT 114. When the switch 214A and switch 214B are in the "LF" (low-frequency) position, the output of the low-speed transmit logic block 208 is provided to the receiver portion 222, and when the switch 214A and switch 214B are in the "HF" position, the output of high-speed transmit logic block 210 is provided to the receiver portion 222. Thus, the switch 214A and switch 214B can be provided to select the TX-direction low-frequency path (LF) (e.g., provided by a D-PHY transmitter) or high-frequency path (HF) and to provide DC common to the high-speed line.

The switch 214A and switch 214B can be controlled by a TX finite state machine (FSM) included in and managed by the configurable integrated circuit 104 (e.g., in the EPHY logic 108) to follow predefined operation phases (e.g., as defined by MIPI specifications) of the DUT 114 (e.g., for the LS mode and the HS mode).

When the switch 214A and switch 214B are in the "LF" position, signals provided by the system 100 can meet the common-mode requirements of the MIPI specification using a native D-PHY transceiver of the configurable integrated circuit 104 (e.g., an FPGA). When the switch 214A and switch 214B are in the "HF" position, the high-speed transmit logic block 210 (e.g., a 32 Gbit/s GTY or PCIe transceiver of an FPGA) uses a different common-mode operation from that described in the MIPI specification (and used by a MIPI DUT 114). This different common mode is internal only to the system 100 and is transparent to (undetectable by) the DUT 114.

The configurable integrated circuit 104 can also include a receive FSM (e.g., in the EPHY logic 108) that starts by sensing lower-frequency signaling using the low-speed receive logic block 204 (e.g., D-PHY) and internally moves the data sensing to the high-speed receive logic block 206 (e.g., GTY, PCIe, etc.) for HS modes. Because there is no RX switch to control in the example glue hardware 102 shown in FIG. 2, the sensing paths are "switched" internally in the logic block(s) of the configurable integrated circuit 104. Using a squelch (SQ) detector, as described further below, the receive FSM can sense the mode and select the appropriate path from which to retrieve data. Thus, the mode (HS or LS) is inferred by the system 100 by "sniffing" the lines 110A.

More specifically, in operation, the receive path circuitry 230 can "sniff" the lines 110A, labeled "P-RX" and "N-RX," and detect for the RX path of each lane the TX line state of the DUT 114 (e.g., of the transmitter portion 220). The system 100 can also provide the appropriate signaling to the DUT 114 over the lines 110B, labeled "P-TX" and "N-TX." The transmitted signals can be entirely independent of the received signals, or the transmitted signals can "mirror" the received mode (e.g., based on the TX line state of the DUT 114). For example, if the system 100 detects that the DUT 114 is operating in a LS mode, the switch 214A and switch 214B can be set to the "LF" positions to allow the low-speed transmit logic block 208 to provide signals, and if the system 100 detects that the DUT 114 is operating in a HS mode, the switch 214A and switch 214B can be set to the "HF" positions to allow the high-speed transmit logic block 210 to provide signals.

As will be described further below in the discussion of FIG. 3, when the system 100 interfaces with a DUT 114 that implements an M-PHY, in the receive direction, the logic block 202 can provide squelch detection to allow the system 100 to monitor and detect when the M-TX of the DUT 114 enters and exits the HIBERN8 state. Per the MIPI specification, when the transmitter is in the HIBERN8 state, upon squelch detection, the M-RX exits the HIBERN8 state and enters the SLEEP (LS mode) or STALL (HS mode) state. Knowing when the DUT 114 exits the HIBERN8 state helps the system 100 identify the SYNC state and the high-speed data that follows during a HS-BURST.

As will be appreciated, the MIPI specification specifies that the transition point between DIF-Z and DIF-N is defined by the squelch threshold level, which is positioned between the DIF-N and DIF-Z electrical line levels. The transition point between DIF-P and DIF-N is at the zero crossing of the differential signal. To detect exits from HIBERN8, the system 100 can detect a non-squelch state for a line transition to DIF-N.

In the example system 100 shown in FIG. 2, to detect the DIF-Z/P/N states and, therefore, squelch (and entry into and exit from HIBERN8), the input signals from the DUT 114 (from the lines 110A) are routed to hardware comparators, comparator 232A and comparator 232B, which compare the input signals to a reference DC level (Vref). The comparator 232A and comparator 232B may be, for example, low-frequency comparators. The outputs of the comparator 232A and comparator 232B can be, for example, 1.8 V High-speed LVCMOS signals that can be routed to, for example, dedicated regular LVCMOS 1V8 FPGA IOs (logic block 202). Common-mode voltage (VCM) matching can be used to align the LS VCM signals to the requirements of the MIPI specification if and when the configurable integrated circuit 104 (e.g., Xilinx FPGA VCM) is too high. The logic block 202 can determine from the output of comparator 232A and comparator 232B whether the RX lane is in the DIF-Z state.

One or more pull-down resistors (e.g., R2 and R4 in FIG. 2) can be used to assist in detecting when the DUT 114 transitions from the HIBERN8 state to the STALL state (HIBERN8 exit). If desired, an optional one or more switches, labeled SQ_PDN_EN in FIG. 2, can be used to allow the pull-down resistors (e.g., R2, R4) to be disconnected in the STALL state in order to reduce current leakage.

To meet the MIPI specification, in the RX direction, the system 100 can detect, by inference, the DC levels of signals delivered over the lines 110A by the DUT 114 during several states, and/or it can detect transitions into and out of states, such as HIBERN8. Because, as described above, the glue hardware 102 provides AC coupling and not DC coupling, the squelch detection described above (e.g., using comparator 232A and comparator 232B) can be used to infer certain of the signal levels and/or state transitions.

In addition, lower-frequency signals can also be sensed by the low-speed receive logic block 204 (e.g., a native D-PHY of an FPGA) whenever the DUT 114 is providing low-frequency signaling over the one or more lines 110, even if the DUT 114 is operating in a HS mode. For example, the low-speed receive logic block 204 can be used to detect the STALL state (DIF-N) and the PREPARE phase (DIF-P) when the DUT 114 is operating in HS mode.

Thus, in the RX direction, the low-speed receive logic block 204 (e.g., a D-PHY RX) can sense DC states on the line, such as STALL and PREPARE, even though the RX path uses AC coupling. The termination of the high-speed receive logic block 206 (e.g., Xilinx GTY, 32 Gbit/s PCIe, or other) will be reflected on the line (to the TX transmitter from the DUT 114) when the SYNC state begins and the capacitances C1, C2, C3, and C4 became "shorts" on the line. Optionally, the inductors L1 and L2 can be controlled to support fine-tuning of the system 100 per gear.

Figure 3:
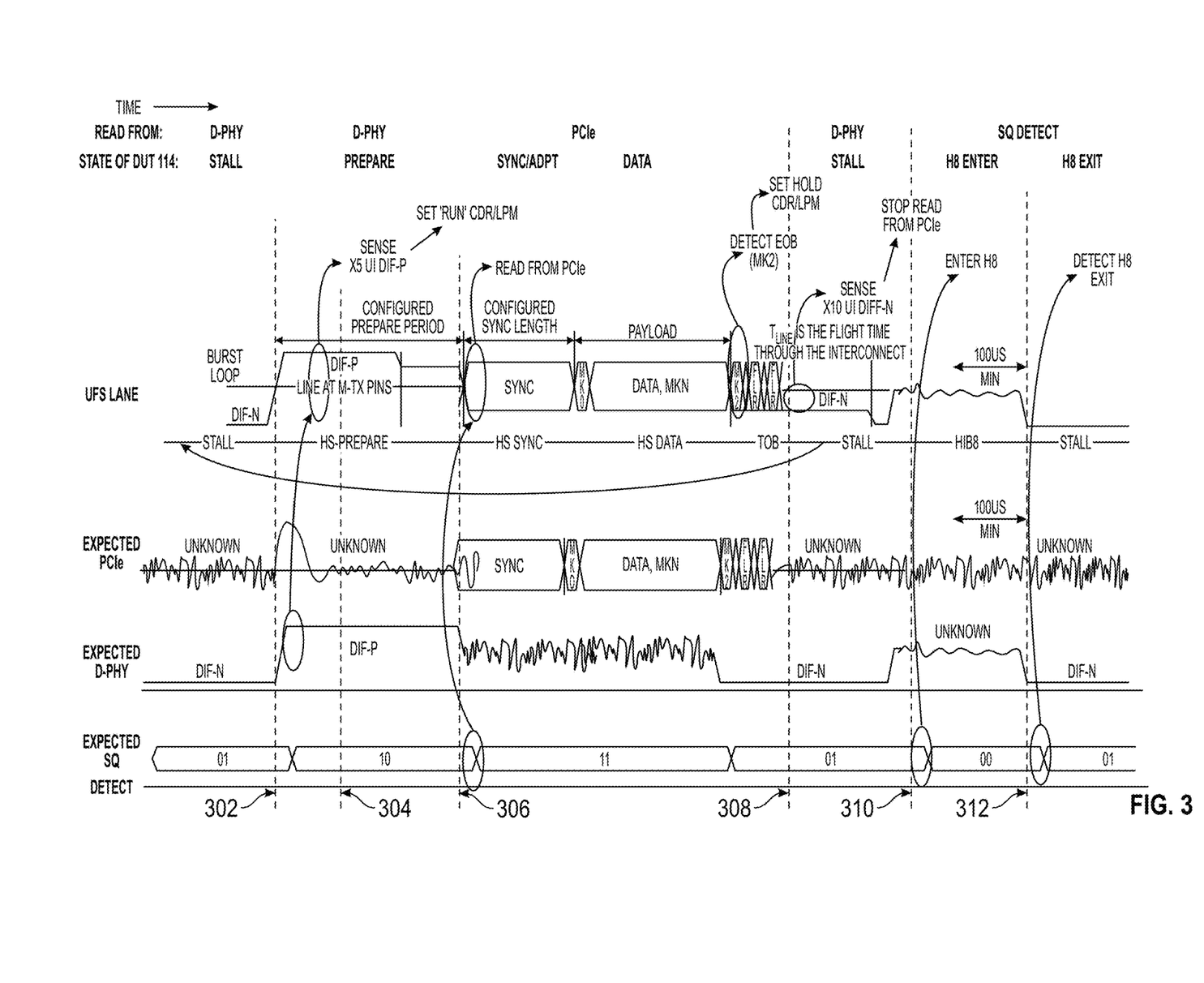
FIG. 3 illustrates how various phases of operation of a connected device can be detected by the system in accordance with some embodiments.

FIG. 3 is an illustration to show an example of how various phases of operation, including HS-BURSTS, can be detected by the system 100 in accordance with some embodiments (e.g., using the example system 100 shown in FIG. 2). FIG. 3 illustrates various signals transmitted by a DUT 114 or detected/inferred by the system 100. The DUT 114 is assumed to be an external Universal Flash Storage (UFS) device compliant with the MIPI M-PHY specification, and the system 100 is assumed to include a configurable integrated circuit 104 that is an FPGA with a native D-PHY transceiver and a native PCIe transceiver. It is to be understood that the techniques disclosed herein can be used in other applications, with other types of DUT 114, with other types of configurable integrated circuits 104, and with other types of native FPGA transceivers.

FIG. 3 shows four signals. The signal labeled "UFS Lane" represents the signal transmitted by the DUT 114 over the lines 110A, labeled "P-RX" and "N-RX" in FIG. 2. The signal labeled "Expected PCIe" is a representation of what the high-speed receive logic block 206 would see, and the signal labeled "Expected D-PHY" is a representation of what the low-speed receive logic block 204 would see. Finally, the signal labeled "Expected SQ detect" is the expected result of the squelch detection described above.

Beginning from the left-hand side of FIG. 3, the DUT 114 begins in the STALL state, and the system 100 begins by sensing using the D-PHY (or, more generally, the low-speed receive logic block 204), as indicated in FIG. 3. The high-speed receive logic block 206 sees a floating signal due to AC coupling (e.g., capacitors). The squelch detector senses the state 01, corresponding to DIF-N.

Shortly after the DUT 114 transitions to the PREPARE phase of the HOB at the time 302, the D-PHY (low-speed receive logic block 204) of the configurable integrated circuit 104 detects a transition from DIF-N to DIF-P, and the squelch detector senses the state 10, corresponding to DIF-P. Meanwhile, the PCIe receiver (high-speed receive logic block 206) continues to see a floating signal. Based on the detected transition, the system 100 knows by the time 304 that the DUT 114 has transitioned to the PREPARE phase. The system 100 thus expects other pre-defined signals and states to follow. The configurable integrated circuit 104 can take whatever steps are necessary to prepare itself for data to be received from the DUT 114 over the lines 110A.

At the time 306, the DUT 114 begins to transmit the SYNC sequence, which is a high-frequency signal. The transmission of the SYNC sequence is detected by both the squelch detector (as a change to a state of 11) and the high-speed receive logic block 206. The high-speed receive logic block 206 ("Expected PCIe") detects the SYNC sequence, MARKER0, and the high-speed data, as well as the TOB, because all of these signals pass through the capacitance on the line. The low-speed receive logic block 204 detects what appears to be noise while the SYNC sequence, MARKER0, and high-speed data are transmitted, and it detects DIF-N during the TOB.

Based on the detection of the end of the HS-BURST (e.g., by the low-speed receive logic block 204 and squelch detector detecting DIF-N, and the high-speed receive logic block 206 detecting the TOB), the system 100 knows that the DUT 114 will return to the STALL state, which occurs at the time 308. After the DUT 114 has transitioned to the STALL state, the low-speed receive logic block 204 and squelch detector continue to detect DIF-N, and the high-speed receive logic block 206 once again detects a floating line due to the AC coupling.

At the time 310, the DUT 114 transitions to the HIBERN8 state, which, as described above, can be detected by the squelch detector (state 00). At the time 312, the DUT 114 transitions out of the HIBERN8 state, which is thereafter detected by the squelch detector detecting DIF-N (state 01).

Thus, as illustrated by the example of FIG. 3, the system 100 can, directly or indirectly, detect the various high-speed line states of the DUT 114 as follows: the low-speed receive logic block 204 (e.g., a native D-PHY transceiver) can detect, for example, the STALL state, the PREPARE phase of the HS-BURST, and transitions from the STALL state to the PREPARE phase. The high-speed receive logic block 206 (e.g., a GTY or PCIe transceiver) can detect, for example, the SYNC, MARKER, and data portions of HS-BURSTS. The squelch detection circuitry can detect, for example, transitions into and out of the HIBERN8 state, transitions to PREPARE, and transitions from PREPARE to the SYNC sequence.

Figure 4:
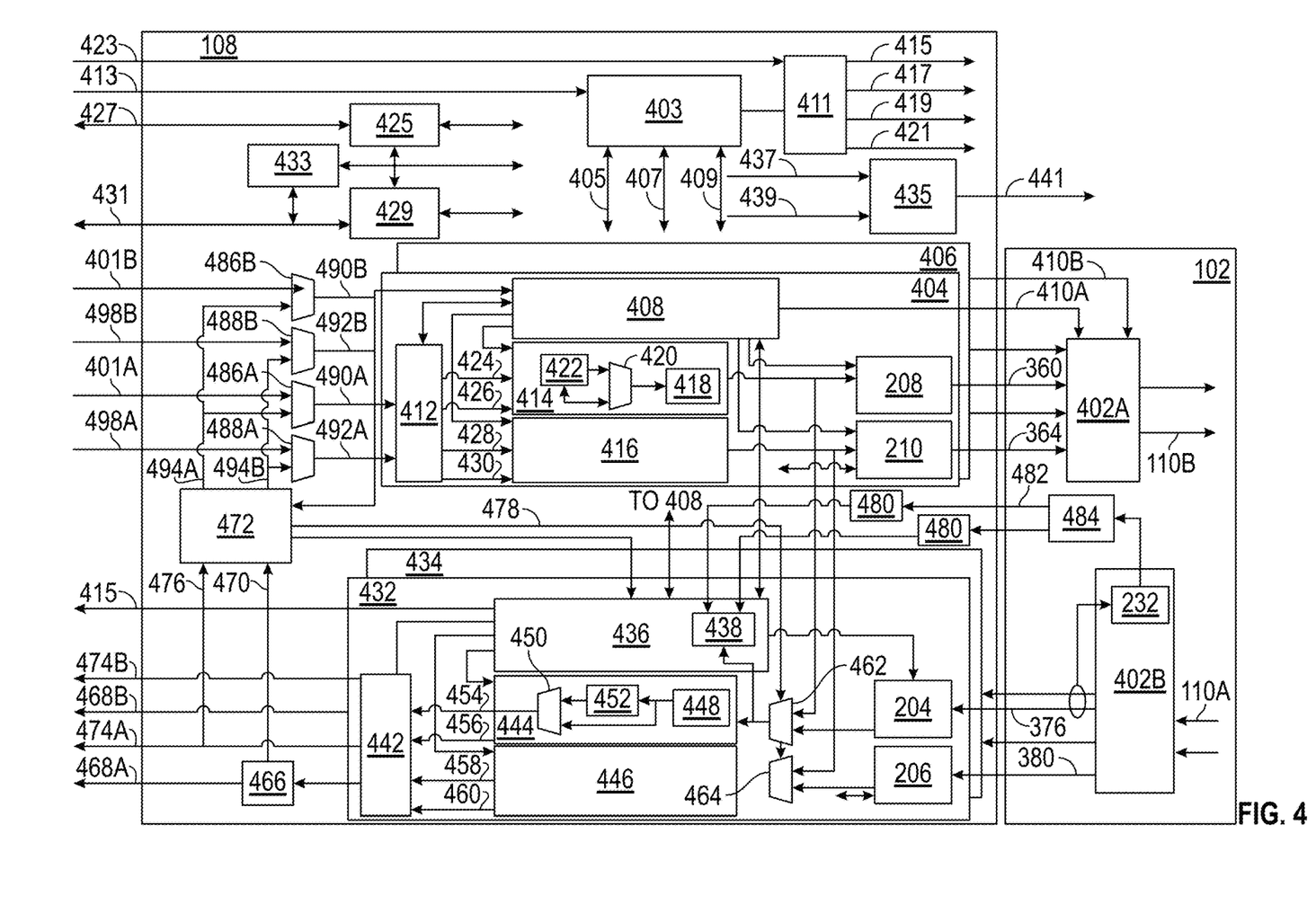
FIG. 4 is a high-level block diagram of the logic that can be incorporated into a configurable integrated circuit for an embedded PHY in accordance with some embodiments.

FIG. 4 is a schematic illustration of an example of the EPHY logic 108 for the EPHY 112 in accordance with some embodiments. The glue hardware 102 includes the hardware 402A, the hardware 402B, and a connector 484. The hardware 402A can comprise, for example, the transmit path circuitry 240 shown in FIG. 2, and the hardware 402B can comprise, for example, the receive path circuitry 230 shown in FIG. 2, including the comparators 232. The EPHY logic 108 includes one or more transmission blocks 404, 406, where each transmission block supports one lane. Each transmission block 404, 406 includes a transmit finite state machine 408, and the transmission block 404 and transmission block 406 are coupled to the hardware 402A via lines 410A, 410B, respectively. Each transmission block 404, 406 also includes a remote monitor and maintenance interface (RMMI) MUX and wrapper 412 that is coupled to the transmit finite state machine 408.

The transmit finite state machine 408 is coupled to both a low speed logic block 414 and a high speed logic block 416. In some embodiments, the low speed logic block 414 includes a pulse width modulator (PWM) encoder 418, as defined by the MIPI standard, which is coupled to the output of a MUX 420. A data signal is input into the low speed logic block 414 from the RMMI MUX and wrapper 412 and split into a line that directly inputs to the MUX 420 and a line that inputs into a delay tap 422 that then inputs to the MUX 420. Both data signals and clock signals are fed to the low speed logic block 414 along lines 424, 426 respectively while data signals and clock signals are fed to the high-speed logic block 416 along lines 428, 430 respectively.

In some embodiments, signals are fed to the RMMI MUX and wrapper 412 through MUXs 486A, 488A for transmission block 404 (486B, 488B for transmission block 406). Specifically, data is fed from MUX 486A while a clock signal is fed from MUX 488A along lines 490A, 492A respectively for transmission block 404 (lines 490B, 492B for transmission block 406). Each MUX 486A, 486B, 488A, 488B receives two inputs. Data MUXs 486A, 486B receive an input along data line 494A from test mode block 472. Clock MUXs 488A, 488B receive a clock signal along clock line 494B from test mode block 472. In some embodiments, the second feed to the MUXs 486A, 486B is a data transmission from an RMMI along line 401A, 401B. The second feed to MUX2 488A, 488B is a clock transmission along clock line 498A, 498B.

The EPHY logic 108 also includes one or more receiving blocks 432, 434, where each receiving block supports one lane. In some embodiments, each receiving block 432, 434 includes a receive finite state machine 436 that includes a line state detector 438. The receive finite state machine 436 is coupled to the transmit finite state machine 408. In some embodiments, each receiving block 432, 434 also includes a RMMI MUX and wrapper 442 that is coupled to the receive finite state machine 436.

The receive finite state machine 436 is coupled to both a low-speed logic block 444 and a high-speed logic block 446. In some embodiments, the low-speed logic block 444 includes a PWM decoder 448, as defined by the MIPI standard. The high-speed logic block 446 is substantially identical to the low speed logic block 444. The output of the PWM decoder 448 is split with a first signal fed to a MUX 450 and a second signal fed to the MUX 450 through a delay tap 452. The output of the MUX 450 is then fed along data line 454 to the RMMI MUX and wrapper 442 along with a signal that is fed along a clock line 456. A data signal and a clock signal are fed from the high-speed logic block 446 to the RMMI MUX and wrapper 442 via lines 458, 460 respectively.

In some embodiments, between the one or more logical low-speed interfaces 122 and the low-speed logic block 444, a MUX 462 is present. The MUX 462 receives an output of the one or more logical low-speed interfaces 122 (e.g., from low-speed receive logic block 204), and the low-speed logic block 414. The output of the MUX 462 is fed to the low-speed logic block 444 as well as to the line state detector 438. Another output of the MUX 462 is fed to another MUX 464. MUX 464 receives the output from one of the one or more logical high-speed interfaces 120 (e.g., from high-speed receive logic block 206) as well as the output of the high-speed logic block 416. The output of the MUX 464 is fed to the high-speed logic block 446.

In some embodiments, the output from the RMMI MUX and wrapper 442 is fed to a symbol clock recover element 466, the output of which is sends a signal along line 468A for receiving block 432 (line 468B for receiving block 434) and a clock signal along line 470 to a test mode block 472. In some embodiments, an additional output from the RMMI MUX and wrapper 442 is also sent out along data line 474A for receiving block 432 (line 474B for receiving block 434) with data also going to test mode block 472 along line 476. A clock signal is sent to the MUX 462 from the test mode block 472 along line 478.

The line state detector 438 receives an input additionally from one or more differential impedance detectors 480, which receive(s) information along line(s) 482 from the output of the hardware 402B (e.g., the comparator 232A and comparator 232B). The number of differential impedance detectors 480 is equal to the number of receiving lanes. For example, FIG. 4 shows two receiving lanes and hence, two differential impedance detectors 480. As explained previously, there may be more than two receiving lanes. For example, it is contemplated that four receiving lanes may be present and hence, four differential impedance detectors 480 would be present.

In some embodiments, the EPHY logic 108 also includes a main controller 403 that is coupled to each receiving block 432, 434 via line 405; coupled to each transmission block 404, 406 via line 407; and coupled to the test mode block 472 via line 409. The main controller 403 is a logical controller of the EPHY logic 108 and is distinct from the controller 106 of the FPGA. The main controller 403 receives a signal along line 413 from a main or host device to permit a device external to the system 100 to control the system 100. In some embodiments, the main controller 403 is also coupled to a clock generator 411. The clock generator 411 generates the clock signal that is transmitted along lines

415, 417, 419, 421 to the various entities that use a clock signal as noted above, and receives the reference clock signal along line 423.

In some embodiments, the EPHY logic 108 also includes distance measuring equipment (DME) 425 that is coupled with the controller 403 and an RMMI configuration along line 427. DME 425 is also coupled to an EPHY registry 429 that is coupled to the system read/write register bus protocol (e.g., Amba bus) via line 431. In some embodiments, the registry 429 contains the MIPI and EPHY regulations. A bus 433 is also coupled to line 431 and includes the high-speed and low-speed configuration regulations.

In some embodiments, the EPHY logic 108 also includes a low-speed PHY design for debug (DFD) block 435 that receives signals from the FSMs along line 437 and from another source along line 439. The low-speed PHY DFD block 435 outputs along line 441.

In FIG. 4, the transmission and receiving blocks 404, 406, 432, 434 per lane are shown, and the M-PHY specification defines the lanes orthogonally among the lanes and paths. It is again noted that while FIG. 4 simply shows two lanes, the disclosure is not to be limited to two lanes. Rather, it is to be understood that the use of more lanes, such as four lanes as allowed by the MIPI standard, is contemplated. The transmit finite state machine 408 and receive finite state machine 436 control certain of the hardware 402A, 402B. The transmit finite state machine 408 has a sub-block that implements the low-speed using the PWM encoder 418 on a per-lane basis. Likewise, the receive finite state machine 436 has a sub-block that implements the low-speed using the PWM decoder 448 on a per lane basis. The sub-blocks also implement the high-speed encoding/decoding of data to the serial line interface on a per-lane basis. The interface to the upper layer of the protocol stack can be a fixed 40-bit/lane that can be increased to, for example, an 80 to 160 bit/lane when the speed/gear increases to future generations of the protocols, such as Gear6.

The EPHY logic 108 and system 100 support scaling to several generations of devices, such as MIPI devices. The EPHY low-level of transmission block 404, transmission block 406, receiving block 432, receiving block 434, transmit finite state machine 408, and receive finite state machine 436 are configured to reflect to the system 100 the entire interface state, such as the accurate point of entering the HIBERN8 state, exiting the HIBERN8 state, a STALL or SLEEP state, the beginnings and ends of high-speed bursts on the transmission or receive lines, and more, which allows accurate control of interface accurate timing in order to enforce and measure the DUT 114 and also mimic other host devices.

The design of the system 100 provides the flexibility to accommodate updates to the PHY specification (e.g., higher-speed interfaces) without the need for an ASIC production cycle and can be used even with out-of-specification devices, which is beneficial when the specification is not yet in its finalized form. The DFD capability is much higher compared to external PHY chips. The system 100 is capable of capturing and logging a variety of events in order to allow a large suite of devices to be debugged. Additionally, there is an ability to sense the real DUT interface for tooling capabilities. The embodiments discussed herein also are ready for future generation support (e.g., G6 support) without relying on a new test chip, thus requiring no additional costs.

In the foregoing description and in the accompanying drawings, specific terminology has been set forth to provide a thorough understanding of the disclosed embodiments. In some instances, the terminology or drawings may imply specific details that are not required to practice the invention.

To avoid obscuring the present disclosure unnecessarily, well-known components are shown in block diagram form and/or are not discussed in detail or, in some cases, at all.

Unless otherwise specifically defined herein, all terms are to be given their broadest possible interpretation, including meanings implied from the specification and drawings and meanings understood by those skilled in the art and/or as defined in dictionaries, treatises, etc. As set forth explicitly herein, some terms may not comport with their ordinary or customary meanings.

As used in the specification and the appended claims, the singular forms "a," "an" and "the" do not exclude plural referents unless otherwise specified. The word "or" is to be interpreted as inclusive unless otherwise specified. Thus, the phrase "A or B" is to be interpreted as meaning all of the following: "both A and B," "A but not B," and "B but not A." Any use of "and/or" herein does not mean that the word "or" alone connotes exclusivity.

As used in the specification and the appended claims, phrases of the form "at least one of A, B, and C," "at least one of A, B, or C," "one or more of A, B, or C," and "one or more of A, B, and C" are interchangeable, and each encompasses all of the following meanings: "A only," "B only," "C only," "A and B but not C," "A and C but not B," "B and C but not A," and "all of A, B, and C."

To the extent that the terms "include(s)," "having," "has," "with," and variants thereof are used in the detailed description or the claims, such terms are intended to be inclusive in a manner similar to the term "comprising," i.e., meaning "including but not limited to."

The terms "exemplary" and "embodiment" are used to express examples, not preferences or requirements.

The term "coupled" is used herein to express a direct connection/attachment as well as a connection/attachment through one or more intervening elements or structures.

The term "between" is used herein to refer to a relative position of one feature with respect to other features. For example, one feature disposed "between" two features may be directly in contact with the two features or may have one or more intervening features or materials.

The term "substantially" is used to describe a structure, configuration, dimension, etc. that is largely or nearly as stated, but, due to manufacturing tolerances and the like, may in practice result in a situation in which the structure, configuration, dimension, etc. is not always or necessarily precisely as stated.

The drawings are not necessarily to scale, and the dimensions, shapes, and sizes of the features may differ substantially from how they are depicted in the drawings.

Although specific embodiments have been disclosed, it will be evident that various modifications and changes may be made thereto without departing from the broader spirit and scope of the disclosure. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

The invention claimed is:

1. A system, comprising:
 a configurable integrated circuit; and
 an embedded physical layer (EPHY), the EPHY comprising:
  a logic portion disposed in the configurable integrated circuit; and a glue hardware portion coupled to the configurable integrated circuit and configured to provide AC coupling between at least one interface of the configurable integrated circuit and a serial interface of an external device, wherein the glue hardware portion comprises a plurality of capacitors, a plurality of inductors, and a plurality of resistors.

2. The system recited in claim 1, wherein the configurable integrated circuit comprises a field-programmable gate array (FPGA).

3. The system recited in claim 2, wherein the logic portion comprises at least one native transceiver of the FPGA.

4. The system recited in claim 3, wherein the at least one native transceiver comprises a Mobile Industry Processor Interface (MIPI) D-PHY transceiver.

5. The system recited in claim 3, wherein the at least one native transceiver comprises a native PCIe transceiver.

6. The system recited in claim 1, wherein the glue hardware portion comprises receive-path circuitry configured to assist the logic portion in detecting a line state of a transmitter of the external device.

7. The system recited in claim 6, wherein detecting the line state of the transmitter of the external device comprises detecting an entry into or exit from a reduced-power state.

8. The system recited in claim 7, wherein the logic portion is configured to perform operations of a Mobile Industry Processor Interface (MIPI)-compliant receiver, and wherein the reduced-power state is at least one of HIBERN8, STALL, or SLEEP.

9. The system recited in claim 6, wherein the line state of the transmitter of the external device is one of a plurality of line states, and wherein the logic portion comprises a high-speed receive logic block, a low-speed receive logic block, and a squelch detector, and wherein the logic portion is configured to determine the line state of the transmitter of the external device using at least one of the high-speed receive logic block, the low-speed receive logic block, or the squelch detector.

10. The system recited in claim 6, wherein the logic portion comprises a first transmit logic block and a second transmit logic block, wherein the first transmit logic block is configured to operate at a higher maximum bit rate than the second transmit logic block, and wherein the glue hardware portion further comprises transmit-path circuitry comprising a transmit-path switch configured to couple either the first transmit logic block or the second transmit logic block to the serial interface of the external device, and wherein the logic portion is further configured to control a position of the transmit-path switch based on the detected line state of the transmitter of the external device.

11. The system recited in claim 1, wherein the logic portion comprises at least one logic block configured to provide functionality of a receiver, and wherein the glue hardware portion comprises receive path circuitry.

12. The system recited in claim 11, wherein at least a portion of the receive path circuitry is configured to assist the logic portion to identify a line state of the external device.

13. The system recited in claim 11, wherein the at least one logic block is configured to receive differential signals over a first line and a second line, and wherein the receive path circuitry comprises a first comparator and a second comparator, wherein:
a first input of the first comparator is coupled to the first line,
a second input of the first comparator is coupled to a reference voltage,
a first input of the second comparator is coupled to the second line, and a second input of the second comparator is coupled to the reference voltage.

14. The system recited in claim 13, wherein the first input of the first comparator is coupled to the first line through a first at least one resistor, and the first input of the second comparator is coupled to the second line through a second at least one resistor.

15. The system recited in claim 14, wherein the first input of the first comparator is coupled to a first pull-down resistor, and the first input of the second comparator is coupled to a second pull-down resistor.

16. The system recited in claim 1, wherein the logic portion is configured to control a transmit path.

17. The system recited in claim 16, wherein the glue hardware portion comprises transmit-path circuitry configured to assist the logic portion to provide, to the external device, either a lower-speed signal or a higher-speed signal.

18. The system recited in claim 16, wherein the logic portion comprises a first logic block configured to operate as a higher-speed transceiver and a second logic block configured to operate as a lower-speed transceiver, and wherein the glue hardware portion further comprises transmit path circuitry comprising:
a first inductor;
a switch coupled to and controlled by the logic portion, the switch having a first position in which the lower-speed transceiver is connected to the first inductor and a second position in which the higher-speed transceiver is connected to the first inductor; and
a passive circuit connected to the higher-speed transceiver, wherein the passive circuit comprises a second inductor, a plurality of resistors, and a capacitor.

19. The system recited in claim 16, wherein the logic portion comprises a first logic block configured to operate as a higher-speed transceiver and a second logic block configured to operate as a lower-speed transceiver, and wherein the logic portion is configured to transmit differential signals over a first line and a second line, and wherein the glue hardware portion further comprises transmit path circuitry comprising:
a first inductor;
a first switch coupled to and controlled by the logic portion, the first switch having a first position in which a first interface of a transmitter of the lower-speed transceiver is connected to the first inductor and a second position in which a first interface of a transmitter of the higher-speed transceiver is connected to the first inductor;
a first passive circuit connected to the first interface of the transmitter of the higher-speed transceiver, wherein the first passive circuit comprises a second inductor, a first plurality of resistors, and a first capacitor;
a third inductor;
a second switch coupled to and controlled by the logic portion, the second switch having a first position in which a second interface of the transmitter of the lower-speed transceiver is connected to the third inductor and a second position in which a second interface of the transmitter of the higher-speed transceiver is connected to the third inductor; and
a second passive circuit connected to the second interface of the transmitter of the higher-speed transceiver, wherein the second passive circuit comprises a fourth inductor, a second plurality of resistors, and a second capacitor.

20. A method of using a configurable integrated circuit to communicate over an AC-coupled path with a Mobile Industry Processor Interface (MIPI) device, the AC-coupled path including a plurality of capacitors, a plurality of inductors, and a plurality of resistors, the method comprising:
   via at least one interface of the configurable integrated circuit, receiving, over the AC-coupled path, a MIPI signal transmitted by the MIPI device; and
   determining a line state of the MIPI device based on the received MIPI signal.

21. The method of claim 20, wherein determining the line state of the MIPI device based on the received MIPI signal comprises detecting a transition into or out of a HIBERN8, STALL, or SLEEP state.

22. The method of claim 20, wherein determining the line state of the MIPI device based on the received MIPI signal comprises:
   a comparator comparing a level of the received MIPI signal to a reference voltage; and
   the configurable integrated circuit obtaining an output from the comparator.

23. The method of claim 20, wherein determining the line state of the MIPI device based on the received MIPI signal comprises detecting a squelch signal.

24. The method of claim 20, wherein determining the line state of the MIPI device based on the received MIPI signal comprises using a first transceiver of the configurable integrated circuit to detect a first line state and using a second transceiver of the configurable integrated circuit to detect a second line state.

25. The method of claim 24, wherein the first transceiver comprises a D-PHY transceiver and the second transceiver comprises a PCIe transceiver.

26. The method of claim 24, wherein the first line state comprises a STALL state, a SLEEP state, or a PREPARE phase.

27. The method of claim 26, wherein the second line state comprises a data transmission phase.

28. A system for communicating with a Mobile Industry Processor Interface (MIPI) device, the system comprising:
   a configurable integrated circuit;
   means for AC coupling an interface of the MIPI device to at least one interface of the configurable integrated circuit; and
   means for receiving a MIPI transmit signal from the MIPI device,
   wherein the means for AC coupling the interface of the MIPI device to the at least one interface of the configurable integrated circuit comprise a plurality of capacitors, a plurality of inductors, and a plurality of resistors.

29. The system recited in claim 28, wherein the configurable integrated circuit comprises:
   means for determining a line state of the MIPI device based on the received MIPI transmit signal.

30. The system recited in claim 28, further comprising:
   means for selectively providing one of a higher-speed signal or a lower-speed signal to the MIPI device.

* * * * *